United States Patent [19]
Mark et al.

[11] 3,933,734
[45] Jan. 20, 1976

[54] FLAME RETARDANT POLYCARBONATE COMPOSITION

[75] Inventors: Victor Mark; Thomas J. Hoogeboom, both of Evansville, Ind.

[73] Assignee: General Electric Company, Pittsfield, Mass.

[22] Filed: Dec. 28, 1973

[21] Appl. No.: 429,643

[52] U.S. Cl. .................. 260/45.7 S; 260/47 XA
[51] Int. Cl.² ............................................ C08K 5/42
[58] Field of Search .................. 260/45.7 S, 79.8 R

[56] References Cited
UNITED STATES PATENTS

| | | | |
|---|---|---|---|
| 2,283,236 | 5/1942 | Soday | 260/505 |
| 2,533,210 | 12/1950 | Baer | 260/93.5 |
| 3,374,210 | 3/1968 | Muller et al. | 260/79.3 |
| 3,398,212 | 8/1968 | Jackson, Jr. et al. | 260/860 |
| 3,403,036 | 9/1968 | Hindersinn et al. | 260/45.75 |
| 3,475,372 | 10/1969 | Gable | 260/45.75 |
| 3,663,498 | 5/1972 | Uebe et al. | 260/40 |
| 3,703,562 | 11/1972 | Antonen et al. | 260/825 |
| 3,775,367 | 11/1973 | Nouvertne | 260/45.9 |

OTHER PUBLICATIONS

Simpson et al., Chem. Abs., Vol. 32, 1938, 678[4].
Trojna et al., Chem. Abs., Vol. 52, 1958, 16254e.

*Primary Examiner*—Donald E. Czaja
*Assistant Examiner*—R. A. White
*Attorney, Agent, or Firm*—Donald M. Papuga; William F. Mufatti

[57] ABSTRACT

A flame retardant polycarbonate composition comprising in admixture an aromatic carbonate polymer and a flame retardant additive which may be the metal salts of either monomeric or polymeric aromatic sulfonic acids, or mixtures thereof.

8 Claims, No Drawings

FLAME RETARDANT POLYCARBONATE COMPOSITION

This invention is directed to a flame retardant polycarbonate composition and in particular an aromatic polycarbonate containing in admixture therewith a particular flame retardant additive which may be the metal salts of either monomeric or polymeric aromatic sulfonates, or mixtures thereof.

BACKGROUND OF THE INVENTION

With the increasing concern for safety, there is a positive move towards providing safe materials for public and household use. One particular area of need is that of providing flame resistant or flame retardant products for use by the ultimate consumer. As a result of this demand, many products are being required to meet certain flame retardant criteria both by local and federal government and the manufacturers of such products. One particular set of conditions employed as a measuring standard for flame retardancy is set forth in Underwriters Laboratories, Inc. Bulletin 94. This Bulletin sets forth certain conditions by which materials are rated for self-extinguishing characteristics.

In the art, there are many known flame retardant additives which are employed by mixing with products to render such materials self-extinguishing or flame retardant. Such flame retardant additives have been known to be employed in amounts of 5 to 20 weight percent in order to be effective in extinguishing burning of those products which are combustible. It has also been found that such amounts can have a degrading effect upon the base product to be rendered flame retardant, resulting in the losses of valuable physical properties of the base product. This is particularly so when employing known flame retardant additives with the base product polycarbonate resins. Many of these known additives have a degrading effect upon the polymer.

DESCRIPTION OF THE INVENTION

It has now been surprisingly discovered that an aromatic polycarbonate can be made flame retardant by incorporating with the aromatic polycarbonate minor amounts of certain additives, which additives are inert and do not degrade the aromatic polycarbonate. The particular additive employed herein is unique in that even very minor amounts render the aromatic polycarbonate flame retardant. The amount of the additive employed herein can vary, preferably, from 0.01 to about 10 weight percent based on the weight of the aromatic polycarbonate.

More specifically, the particular additive of this invention is the metal salt of either the monomeric or polymeric aromatic sulfonates or mixtures thereof. The metal salt employed in the practice of this invention is either the alkali metal or alkali earth metal salt and can include mixed metal salts. The metals of these groups are sodium, lithium, potassium, rubidium, cesium, beryllium, magnesium, calcium, strontium and barium.

In the practice of this invention, the types of aromatic sulfonates employed herein may be either the monomeric form of the polymeric form or mixtures thereof. When first considering the monomeric form, the metal salt of the substituted monomeric aromatic sulfonate can best be represented by the following formula:

$$[A]_{a-1}[R]_{a-2}[B] \qquad \text{I.}$$

wherein [A] and [B] can, in turn, be independently selected from the following formula:

$$(SO_3M)_yR' \qquad \text{II.}$$

wherein M is a metal which may be selected from the periodic table of either an alkali metal or an alkali earth metal, R' is an aryl radical of 1–4 aromatic rings, and y an integer of 0–10. It is to be understood, however, that in Formula I, there must be at least one (1) $SO_3M$ radical.

In Formula I above, [R] is an organic radical of 1–20 carbon atoms and is either alkyl, aralkyl, alkenyl, aralkenyl, aryl, arylene, alkylene, aralkylene, alkenylene, aralkenylene, alkylidene, aralkylidene, alkenylidene or aralkenylidene. It should also be understood that [R] can contain halogen substitutents such as chlorine, bromine or fluorine.

As indicated above, Formula I, in its simplest form, can consist merely of [B] which in turn would be merely Formula II with y being equal to 1. This is where [A] and [R] would be zero. Thus, the simplest formula is as follows:

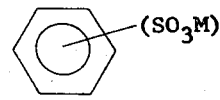

and more specifically

Actually, while there are many compounds that meet the requirements of Formula I and which offer excellent flame retardant characteristics to an aromatic polycarbonate, the preferred additive employed in the monomeric form is disodium naphthalene-2,6-disulfonate. This has the following formula:

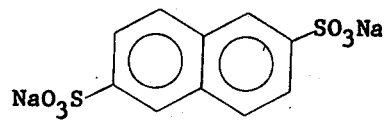

Mixtures of the metal salts of the monomeric aromatic sulfonic acids can be employed herein.

When the polymeric form of the aromatic sulfonate is employed in the practice of this invention, it can best be represented by the following formula:

$$[A]_m[R_1]_{m+n}[B]_n \qquad \text{III.}$$

wherein [A] and [B] are independently selected from the following formula:

$$(SO_3M)_yR' \qquad \text{IV.}$$

wherein R', M, and y have the same meaning as recited previously. In addition, the same requirement for y is also applicable. However, it is also understood that [A] and [B] units can be randomly selected. In addition, $[R_1]$ is an organic radical of 1–20 carbon atoms and is either arylene, alkylene, aralkylene, alkenylene, aralkenylene, alkylidene, aralkylidene, alkenylidene and aralkenylidene. In the polymeric form, $[R_1]$ cannot be monovalent as in the case of the monomeric form of the additive employed herein and described by Formula I above. In Formula III, the sum of m and n must be at least 4 and can be as high as 4,000. As shown, the selection of m and n can be random or equal or one can be zero (0). In Formula III, $R_1$ can also contain halogen substituents as previously recited for [R] of Formula I.

In the practice of this invention, it is to be understood that the polymeric structure can be either a homopolymer, a copolymer, a random copolymer, a block copolymer or a random-block copolymer, including mixtures thereof. In addition, the ratio of sulfonated aromatic rings to unsulfonated aromatic rings can vary from greater than 1 to 1 to as high as that which is necessary to render the polycarbonate flame retardant. This may be 1 to 100.

Preferred Embodiment of the Invention

In order to more fully and clearly illustrate the present invention, the following specific examples are presented. It is intended that the examples be considered as illustrative rather than limiting the invention disclosed and claimed herein. In the examples, all parts and percentages are on a weight basis unless otherwise specified.

EXAMPLE I

Ninety-nine parts of an aromatic polycarbonate, prepared from 2,2-bis(4-hydroxyphenyl)propane and phosgene in the presence of an acid acceptor and a molecular weight regulator and having an intrinsic viscosity of about 0.57, is mixed with 1 part of a finely ground dehydrated additive listed in Table I by tumbling the ingredients together in a laboratory tumbler. The resulting mixture is then fed to an extruder which is operated at about 265°C., and the extrudate is comminuted into pellets.

The pellets are then injection molded at about 315°C. into test bars of about 5 by ½ by about 1/16–1/8 inch thick. The test bars (5 for each additive listed in the Table) are then evaluated in accordance with the test procedure of Underwriters' Laboratories, Inc., Bulletin UL-94, May, 1971, Burning Test for Classifying Materials. In accordance with the test procedure, materials are classified as either SE-0, SE-I or SE-II. The results are based on five specimens. The criteria for SE rating per UL-94 is briefly as follows:

"SE-0": Average flaming and/or glowing after removal of the igniting flame shall not exceed 5 seconds and none of the specimens shall drip flaming particles which ignite absorbent cotton.

"SE-I": Average flaming and/or glowing after removal of the igniting flame shall not exceed 25 seconds and the flowing does not travel vertically for more than one-eighth inch of the specimen after flaming ceases and glowing is incapable of igniting absorbent cotton.

"SE-II": Average flaming and/or glowing after removal of the igniting flame shall not exceed 25 seconds and the specimens drip flaming particles which ignite absorbent cotton.

In addition, a test bar which continues to burn for more than 25 seconds after removal of the igniting flame is classified, not by UL-94, but the standards of the instant invention, as "burns". Further, UL-94 requires that all test bars in each test group must meet the SE type rating to achieve the particular classification. Otherwise, the 5 bars receive the rating of the worst single bar. For example, if one bar is classified as SE-II and the other four are classified as SE-0, then the rating for all 5 bars is SE-II.

The results of the different additives within the scope of the instant invention are as follows with a control being the aromatic polycarbonate as prepared above without the additive of the type set forth herein.

TABLE 1

| Additive (1.0 weight percent) | Flame Out Time Seconds (Avg.) | No. of Drips Per Test Bar | Rating | Remarks |
|---|---|---|---|---|
| CONTROL | 31.6 | 4+ | Burns | Two of the test specimens had flame time of 22.5 seconds |
| Sodium benzenesulfonate | 3.0 | 2 | SE-II | |
| Strontium benzenesulfonate | 9.1 | 1.5 | SE-II | |
| Magnesium benzenesulfonate | 7.5 | 3.0 | SE-II | |
| Dipotassium ortho-benzenedisulfonate | 2.5 | 3.0 | SE-II | |
| Disodium naphthalene-2,6-disulfonate | 4.5 | 2.0 | SE-II | |
| Calcium biphenyl-3,3'-disulfonate | 6.8 | 4.0 | SE-II | |
| Disodium salt of 1,1,1-trichloro-2,2-diphenylethane-4,4'-disulfonic acid | 6.6 | 1.6 | SE-II | |
| Disodium salt of bibenzyl-4,4-disulfonic acid | 8.9 | 6.2 | SE-II | |
| Disodium salt of triphenylmethane-4,4'-disulfonic acid | 7.7 | 5.0 | SE-II | |
| Disodium salt trans-α,α'-dichloro-stilbene-4,4'-disulfonic acid | 5.5 | 2.2 | SE-II | |
| Potassium tetraphenylethylene-4-sulfonate | 10.2 | 6.0 | SE-II | |
| Sodium p-toluene sulfonate | 1.80 | 0 | SE-II | |
| *Sodium salt of | 3.2 | 0.2 | SE-II | 4 test bars were SE-O |

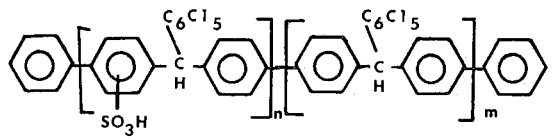

having one sulfonate group in 5.6 repeating units and a molecular weight of about 1080

| *Sodium salt of | 4.9 | 1.9 | SE-II | |

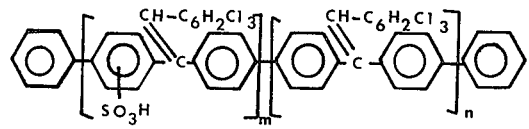

TABLE 1-continued

| Additive (1.0 weight percent) | Flame Out Time Seconds (Avg.) | No. of Drips Per Test Bar | Rating | Remarks |
|---|---|---|---|---|
| having one sulfonate group in 14.6 repeating units and a molecular weight of about 1820 | | | | |
| *Sodium salt of 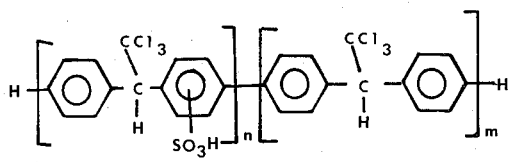 having one sulfonate group in six repeating units and a molecular weight of about 12,000 | 5.6 | 1.6 | SE-II | 2 test bars were SE-I |
| *Potassium salt of  having one sulfonate group in six repeating units and a molecular weight of about 12,000 | 7.0 | 2.1 | SE-II | |
| *Sodium salt of a polystyrenesulfonic acid containing one sulfonate group per 3 phenyl rings and a molecular weight of about 26,000 | 6.1 | 1.2 | SE-II | |
| *Same as above but one sulfonate group per 5.6 phenyl rings | 6.8 | 1.8 | SE-II | |

*Determined by elemental analysis

Example II

This Example is set forth to demonstrate the effect of the flame retardant additives of this invention at the lower limit of 0.01 weight percent based on weight of the polymer composition.

In preparing the test bars for this Example, 99.99 parts of the polycarbonate of Example I are mixed with 0.01 weight percent of the additives listed in Table 2 employing the same mixing procedure. Test bars are then molded using the same molding conditions employed in Example I. The test bars are subjected to the same test procedure of Example I with the following results:

TABLE 2

| Additive (0.01 weight percent) | Flame Out Time Seconds (Avg.) | No. of Drips Per Test Bar | Rating | Remarks |
|---|---|---|---|---|
| CONTROL | 31.6 | 4+ | Burns | |
| Sodium benzenesulfonate | 8.2 | 3.6 | SE-II | |
| Dipotassium ortho-benzenedisulfonate | 9.8 | 3.0 | SE-II | |
| Disodium naphthalene-2,6-disulfonate | 7.6 | 3.2 | SE-II | |
| Sodium salt of polystyrenesulfonic acid containing one sulfonate group per 3 phenyl rings and a molecular weight of about 26,000 | 10.2 | 3.6 | SE-II | |

A. Example I is repeated except that in place of the additives employed therein, only 1 part 1,2,5,6,9,10-hexabromocyclododecane is used herein. The results obtained upon evaluating five (5) test bars are the same as obtained for the Control shown in Table 1 above.

B. Part A. above is repeated but using 5 weight percent of the above additive, namely 1,2,5,6,9,10-hexabromocyclododecane. The results obtained are the same as obtained in Part A. above.

C. Part A. above is repeated but using 10 weight percent of the above additive, namely 1,2,5,6,9,10-hexabromocyclododecane. At this level of additive, test bars are rated SE-II. However, the polycarbonate is badly degraded as evidenced by severe dark streaking of the molded test bars, which degradation does not occur with the additives of the instant invention.

Example III

This Example is set forth to show the effect of a known, commercially available flame retardant additive.

EXAMPLE IV

Example III is repeated except that hexabromobiphenyl is employed herein. The results obtained are essentially the same as those of Example III.

Example V

Example III is repeated except that the additive employed herein is a combination of antimony oxide and a material which is a mixture of polychlorinated biphenyl (Aroclor by Monsanto Company). The proportion of the ingredients of the additive employed in this example is based on 3 parts of chlorine per 1 part of antimony. The results obtained at 1 weight percent and 5 weight percent amounts are the same as in Example III.

However, at the higher amount, namely 10 weight percent, flame retardancy effect is noted but with, again, severe degradation of the polycarbonate, as evidenced by the substantial reduction in the intrinsic viscosity of the molded test bars. As molded, the intrinsic viscosity of the test bars with 1 weight percent of the above additive is about 0.50. The intrinsic viscosity of the molded test bars containing 10 weight percent of the flame retardant additive of this Example is 0.253. This shows the severe degradation of the polycarbonate when employing this type of well known flame retardant.

In the practice of this invention, aromatic carbonate polymers are rendered flame retardant by the addition of certain particular additives which are the metal salts of monomeric or polymeric aromatic sulfonic acids or mixtures thereof. The amount of the additives employed in the practice of this invention may vary from 0.01 to up to that amount which after further increasing does not materially increase the flame retardant properties of the polycarbonate. This is generally up to about 10 weight percent based on the weight of the aromatic carbonate polymer but may be higher. The amount of the additive to be employed can also be a function of the degree of flame retardancy desired.

It is not exactly understood how the additive of this invention functions or how such minor amounts can act as an effective flame retardant for the aromatic carbonate polymer. Analysis of the composition of this invention after being subjected to a fire temperature of about 600°C. shows an unusually high percentage of remaining char. This leads one to hypothesize that the additive may act as a cross-linking agent when the aromatic carbonate polymer is subjected to fire temperatures. However, it is emphasized that this is only theory and should not be construed as actually occurring.

As indicated previously, the additive of the instant invention comprises the alkali or alkali earth metal salts of the monomeric or polymeric aromatic sulfonic acids and includes mixtures thereof. While a great number of such salts are set forth in the tables of the Examples of the instant invention, these are only a representative sample of the additives of this invention. The sodium, calcium, magnesium, potassium, strontium, lithium, barium, rubidium and cesium salts of other aromatic sulfonic acids can be employed in place of those of the Examples with the same effective flame retardancy being achieved. These other aromatic sulfonates are:

meta-benzenedisulfonic acid, disodium salt
para-benzenedisulfonic acid, dipotassium salt
1,3,5-benzenetrisulfonic acid, trisodium salt
biphenyl-4-sulfonic acid, calcium salt
naphthalene-1-sulfonic acid, barium salt
xylene sulfonate, sodium salt
naphthalene-2-sulfonic acid, strontium salt
naphthalene-2,7-disulfonic acid, disodium salt
naphthalene-1,4,7-trisulfonic acid, trisodium salt
anthracene-2,6-disulfonic acid, sodium-potassium salt
phenanthrene-1-sulfonic acid, magnesium salt
pyrene-1,3,6,8-tetrasulfonic acid, tetrasodium salt
diphenylmethane-4-sulfonic acid, calcium salt
1,1-diphenylethane-4,4'-disulfonic acid, disodium salt
2,2-dichloro-1,1-diphenylethylene-4',4''-disulfonic acid, disodium salt
triphenylmethane-4,4',4''-trisulfonic acid, trisodium salt
1,1,2,2-tetraphenylethane-4,4',4'',4'''-tetrasulfonic acid, tetrapotassium salt
fluorenedisulfonic acid, dilithium salt
9,10-dihydroanthracene-2,7-disulfonic acid, disodium salt
sulfonated polybenzyl, polysodium salt
sulfonated polystyrene, polysodium salt
sulfonated polystyrene (crosslinked with divinylbenzene), polysodium salt
sulfonated polybiphenyl, polysodium-potassium salt
sulfonated poly[1,1-di(biphenyl)ethane], polysodium salt In the practice of this invention, the additive is generally prepared by well known methods in the art. For example, one such well known method involves taking an aromatic hydrocarbon such as benzene and contacting it with either sulfuric acid, chlorosulfonic acid, fuming sulfonic acid or sulfur trioxide. These reactions can be carried out at room temperature or at elevated temperatures such as about 50°C. The salt is then prepared by adding the proper alkaline reagent in sufficient amount to make the neutral salt. The salt is then recovered by precipitation or by distillation of the solvent.

In the practice of this invention, any of the aromatic polycarbonates can be employed herein. However, particularly useful are the aromatic polycarbonates prepared by reacting a dihydric phenol, such as bisphenol-A, (2,2'-bis(4 hydroxyphenyl) propane) with a carbonate precursor. Typical of some of the dihydric phenols that may be employed in the practice of this invention are bis(4-hydroxyphenyl)methane, 2,2-bis(4-hydroxyphenyl) propane, 2,2-bis(4-hydroxy-3-methylphenyl)propane, 4,4-bis(4-hydroxyphenyl)heptane, 2,2-(3,5,3',5'-tetrachloro-4,4'-dihydroxydiphenyl)propane, 2,2-(3,5,3',5'-tetrabromo-4,4'-dihydroxydiphenyl) propane, (3,3'-dichloro-4,4'-dihydroxydiphenyl)methane. Other dihydric phenols of the bisphenol type are also available and are disclosed in U.S. Pat. Nos. 2,999,835, 3,028,365 and 3,334,154.

In addition, the reaction is carried out with the carbonate precursor in the presence of a molecular weight regulator, an acid acceptor and a catalyst. The preferred carbonate precursor generally employed in preparing carbonate polymers is carbonyl chloride. However, other carbonate precursors may be employed and this includes other carbonyl halides, carbonate esters or haloformates.

The acid acceptors, molecular weight regulators and catalysts employed in the process of preparing polycarbonates are well known in the art and may be any of those commonly used to prepare polycarbonates.

As indicated previously, the additive employed herein can consist of mixtures of the metal salts. These mixtures can be mixtures of the various metal salts of the monomeric aromatic sulfonic acid or mixtures of the various metal salts of the polymeric aromatic sulfonic acids or mixtures of the metal salts of the monomeric and the polymeric aromatic sulfonic acids. The mixtures have provided certain advantages such as SE-0 rating of 5 test bars and essentially zero number of drips per test bar.

It will thus be seen that the objects set forth above among those made apparent from the preceding description are efficiently attained and since certain changes may be made in carrying out the above process and in the composition set forth without departing from the scope of this invention, it is intended that all matters contained in the above description shall be interpreted as illustrative and not in a limiting sense.

What is claimed is:

1. A flame retardant carbonate polymer composition comprising in admixture an aromatic carbonate polymer and a minor amount of a metal salt of a monomeric aromatic sulfonic acid or mixtures thereof, wherein said metal salts thereof are selected from the group consisting of the alkali metal salts and the alkali earth metal salts and mixtures thereof.

2. The composition of claim 1 wherein the composition comprises in admixture 0.01 to about 10 weight percent of the metal salt of a monomeric aromatic sulfonic acid or mixtures thereof based on the weight of the aromatic carbonate polymer composition.

3. The composition of claim 1 wherein the metal salt of the monomeric aromatic sulfonic acid has the following formula:

[A]$_{0-1}$[R]$_{0-2}$[B]

wherein R is selected from the group of organic radicals consisting of halogen substituted and unsubstituted alkyl, aralkyl, alkaryl, aralkenyl, alkylene, alkylidene, aralkylidene, alkenylidene and aralkenylidene radicals of 1–20 carbon atoms and wherein A and B are independently selected from the following formula:

(SO$_3$M)$_y$R' wherein M is a metal selected from the group consisting of alkali metal and alkali earth metal, R' is an aryl radical of 1–4 aromatic rings and y is an integer of 0–10, provided that the sum of y must equal 1 and wherein when R is 0 and A is 1, the R' radicals of [A] and [B] are directly linked.

4. The composition of claim 3 wherein R in the formula is trichloroethylidene and A in the formula is 1.

5. The composition of claim 3 wherein R in the formula is trichloroethylidene and A and B are each as follows:

(SO$_3$Na)$_1$C$_6$H$_4$ —

6. The composition of claim 3 wherein the metal salt is as follows:

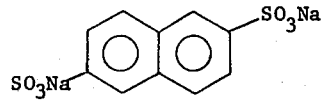

7. The composition of claim 3 wherein the metal salt is calcium benzene sulfonate.

8. The composition of claim 1 wherein the metal salt is sodium benzenesulfonate.

* * * * *